(12) United States Patent
Passanisi

(10) Patent No.: US 10,016,003 B2
(45) Date of Patent: Jul. 10, 2018

(54) SANITARY PROTECTIVE DEVICE FOR FUEL AND EV-POWERED VEHICLES

(71) Applicant: Angelo M. Passanisi, Enfield, CT (US)

(72) Inventor: Angelo M. Passanisi, Enfield, CT (US)

( * ) Notice: Subject to any disclaimer, the term of this patent is extended or adjusted under 35 U.S.C. 154(b) by 0 days.

(21) Appl. No.: 14/880,149

(22) Filed: Oct. 9, 2015

(65) Prior Publication Data

US 2017/0049168 A1    Feb. 23, 2017

Related U.S. Application Data

(60) Provisional application No. 62/062,131, filed on Oct. 9, 2014.

(51) Int. Cl.
| | |
|---|---|
| *A41D 19/00* | (2006.01) |
| *H04W 4/00* | (2018.01) |
| *A41D 13/008* | (2006.01) |
| *A41D 19/015* | (2006.01) |
| *H04W 4/04* | (2009.01) |

(52) U.S. Cl.
CPC ....... *A41D 19/0055* (2013.01); *A41D 13/008* (2013.01); *A41D 19/015* (2013.01); *A41D 19/01529* (2013.01); *A41D 19/01547* (2013.01); *H04W 4/008* (2013.01); *H04W 4/046* (2013.01)

(58) Field of Classification Search
CPC .............. A41D 19/0055; A41D 13/008; A41D 19/015; A41D 19/01529
See application file for complete search history.

(56) References Cited

U.S. PATENT DOCUMENTS

| | | | | | |
|---|---|---|---|---|---|
| 2,327,836 | A | * | 8/1943 | Willard ................ | A63B 71/146 132/73 |
| 3,504,379 | A | * | 4/1970 | Glick .................... | A63B 71/146 2/16 |
| 4,615,049 | A | * | 10/1986 | Samelian .................. | A41F 1/06 2/163 |
| 4,791,682 | A | * | 12/1988 | Herr ........................ | A41D 19/01 2/159 |
| 5,444,874 | A | * | 8/1995 | Samelian ........... | A41D 19/0013 2/159 |
| 5,704,066 | A | * | 1/1998 | Yamamoto ....... | A41D 19/01511 2/160 |

(Continued)

*Primary Examiner* — Shaun R Hurley
*Assistant Examiner* — Andrew W Sutton
(74) *Attorney, Agent, or Firm* — Damian Wasserbauer, Esq.; Wasserbauer Law LLC

(57) ABSTRACT

The present invention relates to an article of manufacture useful as an aftermarket product for fuel and electric vehicle (EV) and, more particularly, for a hand protective device and system and/or method to protect the user from contacting germs, hazardous contaminants, grime, electrocution, and/or other potentially harmful conditions, e.g. while fueling a petroleum and/or an electric powered vehicles. The device and system may be formed in the glove-shape with a fastener means (e.g. from hook and loop fabric) having a hook portion disposed on, for example, a gas cap of a car and/or on a cover of the charging connector and a loop portion 132 affixed or otherwise fastened to the palm portion of the glove. The device and system may further include an opening in a side opposite the palm portion to allow the hand to be slidably inserted easily using a tab located at a wrist portion.

11 Claims, 3 Drawing Sheets

(56) References Cited

U.S. PATENT DOCUMENTS

| | | | |
|---|---|---|---|
| 2002/0116746 A1* | 8/2002 | Williams | A41D 19/0075 2/161.6 |
| 2010/0314427 A1* | 12/2010 | Cartwright | A01K 97/06 224/576 |
| 2013/0007987 A1* | 1/2013 | Kleindorfer | B25G 1/102 16/421 |
| 2016/0029720 A1* | 2/2016 | Lopez-Rocafort | A47G 25/904 2/16 |

* cited by examiner

US 10,016,003 B2

SANITARY PROTECTIVE DEVICE FOR FUEL AND EV-POWERED VEHICLES

This application claims benefit to U.S. provisional patent application No. 62/062,131 filed on Oct. 9, 2014, entitled "SANITARY PROTECTIVE DEVICE FOR FUEL AND EV-POWERED VEHICLES."

FIELD OF THE INVENTION

The present invention relates to an article of manufacture useful as an aftermarket product for fuel and electric vehicle (EV) and, more particularly, for a sanitary hand protective device and system to protect the user from contacting germs at a filling station while fueling a petroleum and/or an electric powered vehicles.

BACKGROUND OF THE INVENTION

Conventional fuel and electric vehicle (EV) filling stations for fueling a petroleum and/or an electric powered vehicles (e.g. a gas station, charging stand, etc.) are utilized on a regular basis by users (i.e. a person) desiring to add fuel or electricity to their vehicle. For example, gasoline pump dispenses petroleum products using a hose with a handle having a nozzle for inserting into the filling port of a vehicle. The user first opens a cap (i.e. gas cap) covering the filling port of the vehicle, in the nozzle the filling port, and dispenses fuel (e.g. gasoline, diesel, etc.) into the vehicle by the user actuating the main valve using the trigger disposed in the handle. Similarly, when charging an electric vehicle, the user opens a cover (i.e. inlet cover) covering the vehicle inlet port to inserts charging connector configured as a handle connecting a cable to the charging station. In each of these situations, numerous users consistently touch the handle that may create an unsanitary condition for the next person use the handle so as to transmit germs, disease, and the like. As a result, there is a need for an article of manufacture, device and system that provides a quick, easy, and safe way to protect the user's skin from coming in contact with germs at a filling station.

SUMMARY OF THE INVENTION

It is an object of the present invention to provide a sanitary hand protective device and system to protect the user from contacting germs at a filling station while fueling petroleum and/or an electric powered vehicle.

It is an object of the present invention to provide an article of manufacture and method useful as an aftermarket product for fuel and electric vehicle (EV) to protect the user from contacting germs at a filling station while fueling a petroleum and/or an electric powered vehicle.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein.

DESCRIPTION OF THE EMBODIMENTS

Figure 1:
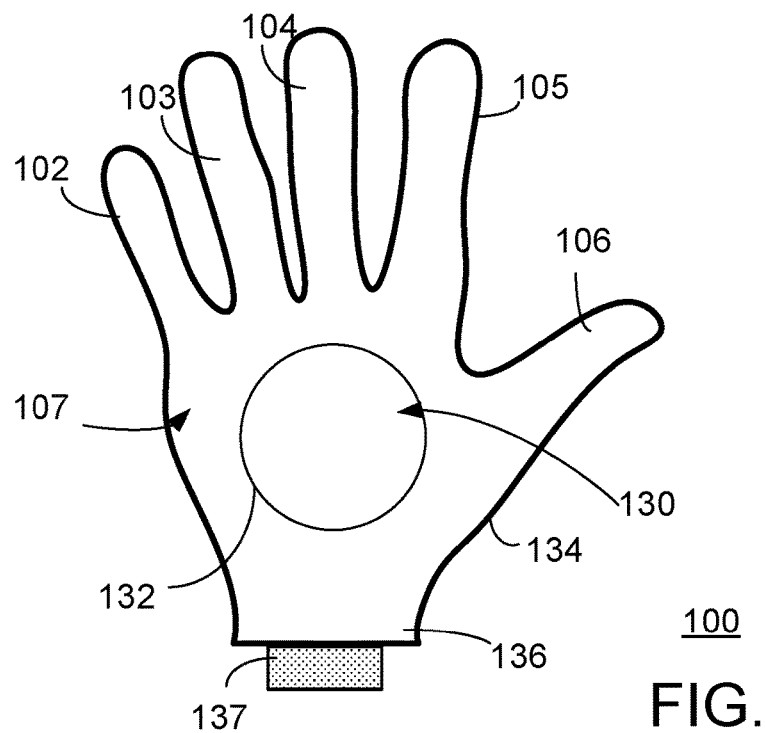
FIG. 1 illustrates a schematic, bottom, palm view of the glove device and system in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "glove" refers to a close-fitting covering for the hand with a separate sheath for each finger and the thumb extending over the wrist. The glove may be made of fire proof material with the palm of the glove covered in rubber will be dipped in rubber to hold the structure of fingers.

As used herein the term "hook and loop fabric" or "Velcro" refers fastening tape, fabric, and/or sheets consisting of a strip of nylon with a surface of minute hooks that fasten to a corresponding strip with a surface of uncut pile. Velcro® is a trademark of Velcro Industries B.V.

Figure 3:
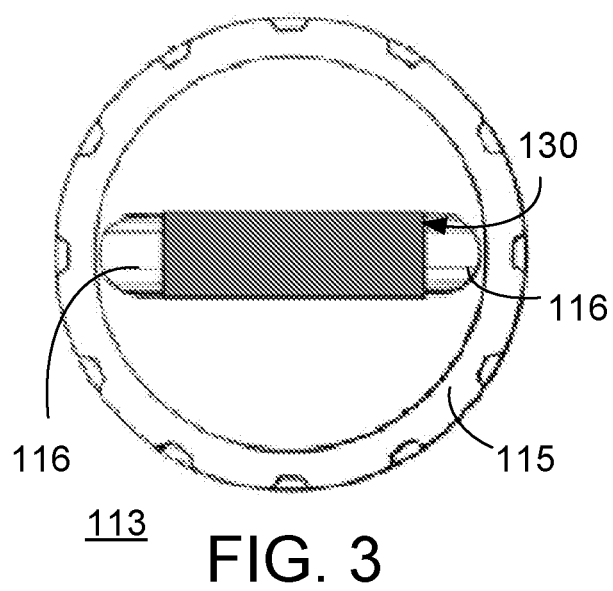
FIG. 3 illustrates a schematic, top view of the filling and/or EV cap of the device and system in accordance with an embodiment of the present invention.
Figure 4:
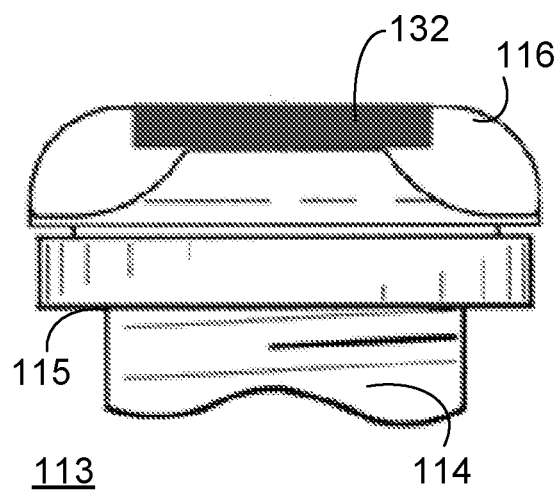
FIG. 4 illustrates a schematic, side view of the filling and/or EV cap of the device and system in accordance with an embodiment of the present invention.
Figure 5:
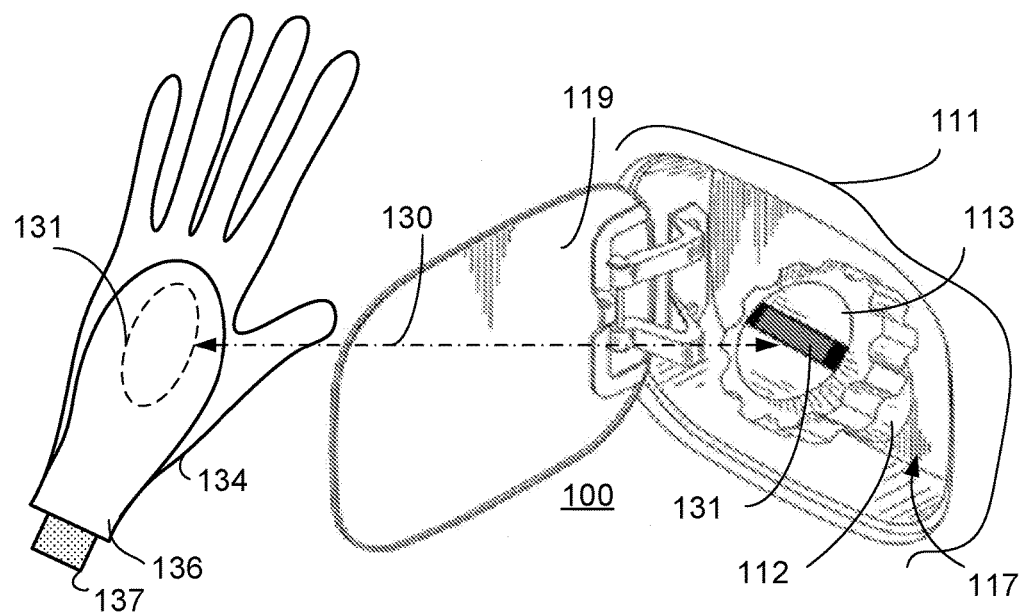
FIG. 5 illustrates a schematic view of the glove and filling and/or EV cap of the device and system in accordance with an embodiment of the present invention.
Figure 6:
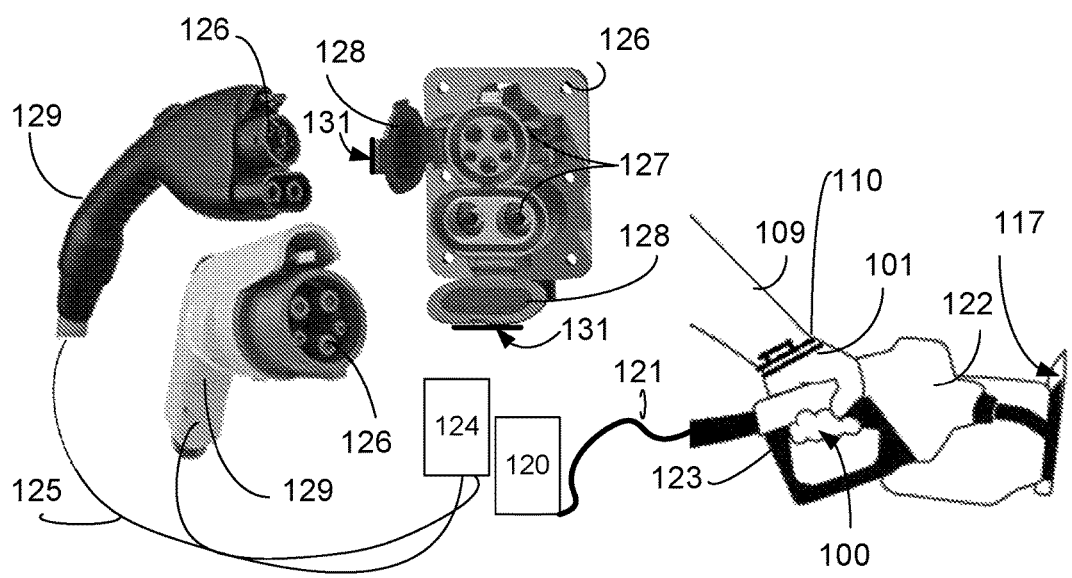
FIGS. 6A and 6B illustrates a schematic view the operation the device and system in operation of filling a vehicle for petroleum and for charging an electric vehicle, respectively, in accordance with an embodiment of the present invention.

As is illustrated in FIGS. 1-6, the present invention is an article of manufacture, device, system and method for a hand protective article to protect the user from contacting germs, hazardous contaminants, grime, electrocution, and/or other potentially harmful conditions at a filling station while fueling a petroleum and/or an electric powered vehicle, generally designated as element 100. According to an embodiment of the present invention, the article of manufacture, device, system and method 100 for a hand protective article is generally described as a glove-type article for fueling a car or electric vehicle 111 as is shown in FIGS. 5 and 6. The operation of filling a car 111 using a filling station or electronic vehicle 111 using a charging station 124 is generally shown in FIG. 6. However, present invention should not be specifically limited to this embodiment as it is contemplated that the present invention may be implemented in yet other embodiments not specifically described herein.

Figure 2:
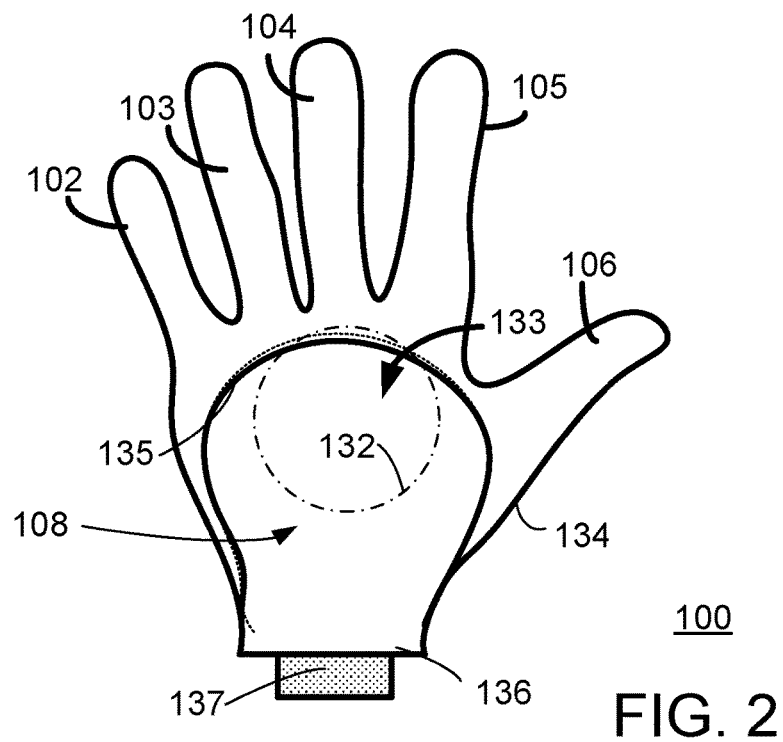
FIG. 2 illustrates a schematic, top view of the glove device and system in accordance with an embodiment of the present invention.

As is illustrated in FIGS. 1 and 2, the device and system 100 can be configured in a glove-shape so as to slidably receive a hand 101 of the user and/or person through an opening 133. The article 100 has extended finger portions 102, 103, 104, 105, and thumb portion 106. The device and system 100 has a palm side 107 and an opening 103 which would expose the back of the hand 108 when inserted into the glove-shaped article 100. The device and system 100 can be configured with a fastener means 130 that may be formed from hook and loop fabric. For example, the glove-shaped article 100 may be configured with a hook portion 131 disposed on, for example, a gas cap 113 (as shown in FIGS. 3-5) and/or on a cover 128 of the charging connector 126 (as shown in FIG. 6), and a loop portion 132 affixed or otherwise fastened to the palm portion 107. The glove-shaped article 100 may further be configured with an wrist portion 136 adapted to be located adjacent a wrist 110 of the arm 109 of the user. The glove-shaped article 100 may further be configured with a pull tab 137 assist in pulling on when inserting the hand 101 into opening 108 slidably fitting on the hand 101 (e.g. pulling on), when removing from the hand 101 (e.g. taking off), and when replacing back on the fueling cap 113 (e.g. fastening for storage).

In operation, as is illustrated in FIG. 6, germs from the handle 122 do not reach the hand 101 of the user when fueling a car and/or electronic vehicle 111 because the hand 101 is disposed in the glove-shaped article 100. The glove-shaped article 100 may be formed from suitable flexible materials such as, for example, cloth, paper, synthetic, man-made materials, e.g. latex, nitrile, rubber, vinyl, knitted or felted wool, leather, rubber, neoprene, metal, and/or Kevlar. Accordingly, a glove-shaped article 100 formed from these materials can provide all of the necessary insulation and protective properties in accordance with the objects of the present invention.

. As is illustrated in FIG. 5, the glove-shaped article 100 may be stored within the inlet 117 of the car and/or electronic vehicle 111 using the fastening means 130 such as, for example, securing the loop portion 132 of the glove-shaped article 100 to the hook portion 131 disposed on the cap 113 and/or on the cover 128 as the case may be and closing the cover 119 to the vehicle inlet compartment 117. The invention alternatively may be mounted to the interior of a cover 119 and/or gas flap vs. the cap 113 and/or on the cover 128.

According to another embodiment of the present invention, the glove-shaped article 100 also may be formed from fireproof fabric 135. The fireproof fabric 135 may be formed in the shape of the glove as a base and then dipped in rubberized coating 134 useful for gripping and fuel-based applications (i.e. oil, grease, petroleum, gasoline, kerosene, diesel, etc.) and in electrical applications (e.g. insulative from electronic shock, etc.). The rubberized coating 134 may also provide easy cleaning and care so as to extend the operating-cycle of the glove-shaped article 100 (e.g. extended use, durability, etc.). The rubberized coating 134 may also provide structure to the article 100, i.e. used for keeping structure of the glove.

In this manner, the article of manufacture, device, system and method 100 for a sanitary hand protective article provides a sanitary way to protect the users hand 101 using a glove, mitt, or any other covering for the hand 101 that will prevent the user from having skin contact with but not limited to a petroleum product (e.g. gas diesel, oil, kerosene), electric filling pump, tire cap(s), handle of windshield wiper fluid stick, tire pressure filler, or any other items at a filling (gas) station (e.g. doors, vehicle, filling machine) to fuel a motor vehicle (e.g. car, truck, SUV, semi-, motor cycle, boat, airplane). According to the embodiments of the present invention, the article and system 100 may be secured using the fastening means 130 so as to place within the vehicle compartment 117, placed in the fuel flap on the fuel cap 113 using suitable fastening means 130 such as, for example, a locking, snapping and/or connecting device to connect the two parts of the system the article 100 to the cap 113, cover 128 or flap within the vehicle inlet compartment 117 which may be secured therein by the cover 119. Described an alternative way, suitable fastening means 130 functions to connect the hand covering article and system 100 (e.g. tips, palm, or any other area on the hand) by way of the fastening device e.g. hook and loop, snap, zipper, magnet, sticky, and/or other suitable connector) to the cap 113, cover 128 or flap within the vehicle inlet compartment 117 which may be secured therein by the cover 119.

As described herein, the hand covering may be formed from fire retardant material 135 coated in a rubber base 134 so as to keep the structure of the article and system 100. The opening 108 in the back of the article and system 100 (e.g. glove, mitt, etc.) is opened below the knuckle forming a large opening 133 for ease of access to apply the covering to the hand 101. Additionally, the fastening means 130 is located at or adjacent the palm 107 on the article and system 100 so as to be centrally located for positioning the fastening system within the vehicle inlet compartment 117 as well as to allow exterior portions to grip, e.g. outer edges of a mitt or the finger portions 102, 103, 104, 105, 106. Moreover, the pull tab 137 is located at or adjacent the wrist portion 136 on the article and system 100 advantageously to provide fitting easily to take covering on/off and to remove/replace back, e.g. on the fueling cap.

While certain configurations of structures have been illustrated for the purposes of presenting the basic structures of the present invention, one of ordinary skill in the art will appreciate that other variations are possible which would still fall within the scope of the appended claims. For example, the glove could be made as a mitt, without individual fingers. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An article of manufacture for use while fueling through an inlet of a petroleum or an electric powered vehicle, the article comprising:
   a glove-shaped cover for protecting a hand of a user from contacting directly potentially harmful conditions, said glove-shaped cover comprising a continuous covering of a plurality of a finger portion configured to encompass a finger therein, and a thumb portion configured to encompass a thumb therein, said glove-shaped cover adapted to receive each of the individual fingers and the thumb of said hand, said glove-shaped cover having a first side configured with a palm portion extending to a wrist portion and a second side configured with an opening opposite said palm portion, said opening opposite said palm portion formed adjacent said finger portions and said thumb portion on said second side terminating at said wrist portion on said first side operably configured to slidably receive said hand of said user, said glove-shaped cover further comprises a tab located on said wrist portion on said first side adapted to pull on and/or remove said glove-shaped cover from said hand of said user, and
   a fastener means for operably connecting said glove-shaped cover to the inlet of the petroleum vehicle and/or the electric powered vehicle, said fastener means configured to be disposed on said palm portion of said hand-shaped cover.

2. The article of claim 1, wherein said fastener means being selected from one of the group of a hook fabric portion and a loop fabric portion, a snap, a magnet, and/or adhesive to secure said palm portion within of a cover of the inlet of the petroleum vehicle and/or the electric powered vehicle.

3. The article of claim 1, wherein said glove-shaped cover may be formed from fireproof fabric.

4. The article of claim 1, wherein said glove-shaped cover may be formed with a rubberized coating.

5. The article of claim 1, wherein said fastener means for operably connecting comprises a hook fabric portion and a loop fabric portion, said hook fabric portion located in the inlet, loop fabric portion disposed on said palm portion of said glove-shaped cover.

6. The article of claim 5, wherein said hook fabric portion located in one of the group of a cover of the inlet, a gas cap, a gas flap and/or a cover of the inlet of a charging connector.

7. An article of manufacture in combination with an inlet for fueling a petroleum or an electric powered vehicle, the article comprising:
   a hand-shaped cover for protecting a hand of a user from contacting directly potentially harmful conditions, said hand-shaped cover comprising a continuous covering of a plurality of a finger portion encompassing a finger therein, and a thumb portion encompassing a thumb therein, said hand-shaped cover adapted to receive each of the individual fingers and the thumb of said hand, hand-shaped cover having a first side configured with a palm portion extending to a wrist portion and a second side configured with an opening opposite said palm portion, said opening opposite said palm portion formed adjacent said finger portions and said thumb portion on said second side terminating at said wrist portion on said first side operably configured to slidably receive said hand of said user, said hand-shaped cover further comprises a tab located on said wrist portion on said first adapted to pull on and/or remove said hand-shaped cover from said hand of said user, and
   a fastener for operably connecting said hand-shaped cover to the inlet of the petroleum vehicle and/or the electric powered vehicle, said fastener means configured to be disposed on said palm portion of hand-shaped cover.

8. The article of claim 7, wherein said fastener means for operably connecting comprises a hook fabric portion and a loop fabric portion, said hook fabric portion located in the inlet, loop fabric portion disposed on said palm portion of said hand-shaped cover.

9. The article of claim 7, wherein said fastener means being selected from one of the group of a hook fabric portion and a loop fabric portion, a snap, a magnet, and/or adhesive to secure said palm portion within of a cover of the inlet of the petroleum vehicle and/or the electric powered vehicle.

10. The article of claim 7, wherein said hand-shaped cover may be formed from fireproof fabric.

11. The article of claim 7, wherein said hand-shaped cover may be formed with a rubberized coating.

* * * * *